United States Patent [19]
De Stoutz

[11] 3,934,042
[45] Jan. 20, 1976

[54] METHOD AND APPARATUS FOR THE IRRADIATIVE TREATMENT OF BEVERAGES

[76] Inventor: William Patrick De Stoutz, Chateau de Larringens, Larringes-sur-Evian, Haute Savoie, France

[22] Filed: July 13, 1973

[21] Appl. No.: 378,996

[30] Foreign Application Priority Data
July 13, 1973 Switzerland............... 10499/73

[52] U.S. Cl. .............. 426/248; 426/519; 426/521; 426/522; 21/52 R; 21/102 R; 21/DIG. 2; 99/275; 99/453; 250/432
[51] Int. Cl.² ....................................... A21D 6/00
[58] Field of Search .......... 426/241, 248, 238, 190, 426/521, 522, 519, 590, 572; 165/66; 21/54 R, 102 R, DIG. 2; 250/432, 435, 436; 99/275, 452, 453; 210/192

[56] References Cited
UNITED STATES PATENTS

| | | | |
|---|---|---|---|
| 1,141,056 | 5/1915 | Helbronner | 426/248 |
| 1,945,102 | 1/1934 | Tranin | 426/248 |
| 2,659,580 | 11/1953 | Hytte | 165/66 |
| 3,512,988 | 5/1970 | Clark | 426/522 |
| 3,550,782 | 12/1970 | Veloz | 210/192 |
| 3,706,631 | 12/1970 | Falk | 426/241 |

OTHER PUBLICATIONS
American College Dictionary, 1970 Random House, NY, p. 1304.

Primary Examiner—Charles N. Hart
Assistant Examiner—Ernest G. Therkorn
Attorney, Agent, or Firm—Young & Thompson

[57] ABSTRACT

Method and apparatus for the irradiative treatment of beverages such as milk, beer, wine and fruit juice, to sterilize or pasteurize them, in which the beverage is pumped through the system out of contact with the air. The entering beverage is heat exchanged against the exiting beverage, and is then subjected to ultra-violet irradiation, and further heat exchange against the exiting beverage. In the case of milk, homogenization can then take place, followed by further heat exchange against returning beverage, and then heating of the beverage by infra-red irradiation to elevated temperature. After infra-red heating, the beverage can be held at elevated temperature in an insulated conduit, after which it returns in heat exchange with entering beverage. The irradiation of the beverage is performed by passing the beverage through transparent conduits, e.g. of fused quartz. Improved taste, shortened cycle time, lower treatment temperatures and prolonged shelf life for the beverages are obtained.

6 Claims, 6 Drawing Figures

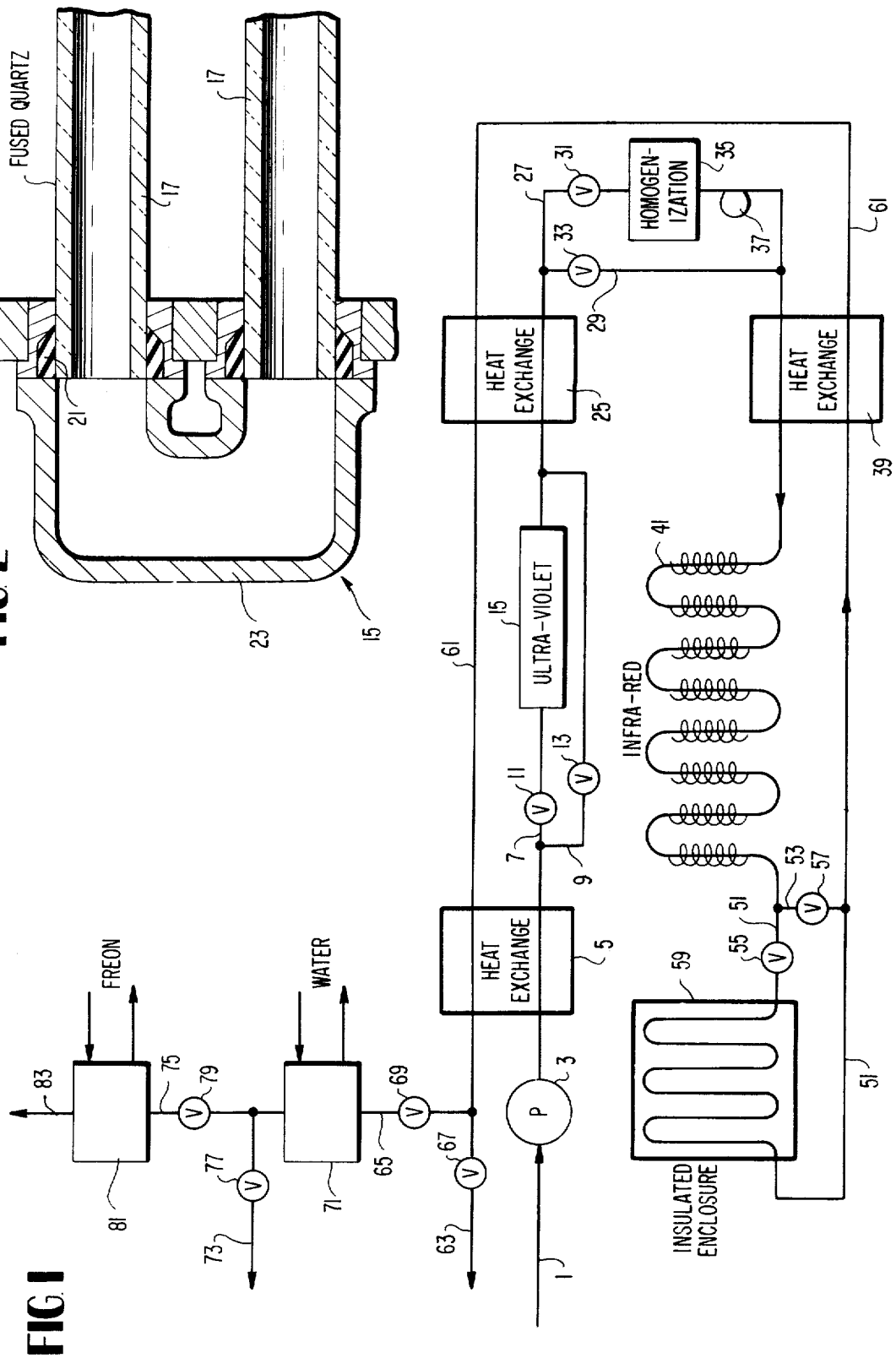

METHOD AND APPARATUS FOR THE IRRADIATIVE TREATMENT OF BEVERAGES

The present invention relates to methods and apparatus for the irradiative treatment of beverages, such as milk and the components and products thereof, beer, wine and fruit juice, so as to sterilize or pasteurize the beverage.

It is an object of the present invention to provide such methods and apparatus, according to which resort may be had to lower treatment temperatures than in the prior art.

Another object of the present invention is the provision of such methods and apparatus, in which the treated beverage will have a better taste than when treated according to the prior art.

Still another object of the present invention is the provision of such methods and apparatus, in which shorter treatment time is needed.

It is also an object of the present invention to provide such methods and apparatus, in which the shelf life or storability of the treated beverage is longer than in the case of the prior art.

Finally, it is an object of the present invention to provide such methods and apparatus, which will be relatively simple and inexpensive to practice, and safe, reliable, and dependable.

Other objects, features and advantages of the present invention will become apparent from a consideration of the following description, taken in connection with the accompanying drawing, in which:

FIG. 1 is a schematic flow diagram of the method and apparatus of the present invention;

FIG. 2 is an enlarged fragmentary cross-sectional view of a portion of the apparatus for exposing the beverage to ultra-violet radiation;

Figure 3:
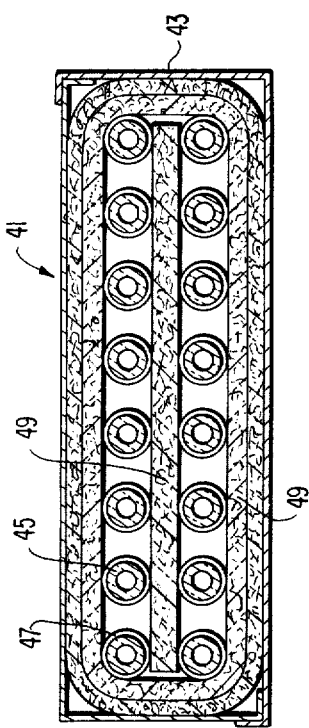
FIG. 3 is an enlarged cross-sectional view of the apparatus for exposing the beverage to infra-red radiation.

Referring now to the drawings in greater detail, and first to the flow diagram of FIG. 1, there is shown a method and apparatus according to the present invention in which the beverage to be treated enters by the conduit 1 and is then increased in pressure in pump 3. Pump 3 may impart only sufficient pressure to the beverage to overcome the pressure drop through the apparatus, so that the beverage remains substantially at atmospheric pressure throughout the cycle; or pump 3 may increase the pressure as desired to superatmospheric pressures up to 100 kg/cm$^2$. In the illustrated embodiment, however, pressure will be assumed to be substantially atmospheric. From pump 3, the beverage proceeds through heat exchanger 5 in which the entering beverage is warmed by indirect heat exchange against exiting beverage. Said beverage then proceeds through one of two branch conduits 7 and 9 controlled by valves 11 and 13, respectively. When valve 11 is open and valve 13 closed, then the beverage proceeds through conduit 7 and through ultra-violet treatment unit 15; but when valve 11 is closed and valve 13 is open, then the beverage proceeds through conduit 9 and bypasses ultra-violet treatment unit 15.

The structure of ultra-violet treatment unit 15 is indicated in greater detail in FIG. 2. It comprises a plurality of transparent tubes 17 of fused quartz which are open at both ends and are arranged in an enclosed chamber constituted at its ends by tube sheets 19 in which the ends of the tubes 17 are removably held by seals 21. Alternate pairs of the adjacent ends of tubes 17 communicate with each other through elbows 23 which are removably secured by connectors (not shown) to adjacent portions of the tube sheets 19. In this way, the beverage follows a zig-zag circuitous course through the bank of tubes 17, and is there subjected to ultra-violet irradiation through conventional wires (not shown) on the outside of tubes 17 between the tube sheets 19, for example at 82 kw/h, 50Hz. The residence time of the beverage in tubes 17 need be, for example, only about 8 or 9 seconds.

From ultra-violet unit 15, the beverage proceeds through heat exchanger 25 to one of two branch conduits 27 and 29, controlled by valves 31 and 33, respectively. When valve 31 is open and valve 33 is closed, then the beverage proceeds through 27 and through a conventional homogenizer 35, and then through a conventional accumulator 37 of the oleopneumatic type by which pressure surges in the line from the homogenizer are levelled. But when valve 31 is closed and valve 33 is open, then the beverage proceeds through conduit 29 and bypasses homogenizer 35.

In either event, the beverage then proceeds through heat exchanger 39, in further heat exchange with returning beverage, and proceeds thence to infra-red unit 41, shown in greater detail in FIG. 3.

Infra-red unit 41 comprises a metal casing 43 in which is contained a bank of fused quartz tubes 45 surrounded by infra-red heating coils 47 arranged in a helical disposition. Bats of glass wool fiber 49 are disposed between the rows of tubes 45 and on the outside thereof. It has been found that the glass fiber is reflective to 86 to 90% of the infra-red radiation and so serves to ensure that by far the greater part of the heat from the coils 47 will be carried off by the liquid passing through the transparent fused quartz tubes 45. The coils 47 are of conventional construction and may be operated so as to impart to the beverage within the tubes 45 a temperature rise of around 10° to 12°C. at a temperature level of about 60° to 90°C. The total residence time of the beverage in the tubes 45 need for example be only about 4 or 5 seconds. Of course these figures are merely given by way of example and are not limitative.

From infra-red unit 41, the beverage passes through one of two conduits 51 and 53, controlled by valves 55 and 57, respectively. When valve 55 is open and valve 57 is closed, then the beverage passes through conduit 51 and through an insulated enclosure 59 in which an extended length of the beverage conduit is disposed, so as to maintain the beverage at the elevated exit temperature of infra-red unit 41 for a period of time sufficient to complete sterilization at that temperature. It will of course be understood that the same purpose can be achieved merely by insulating the exterior of the conduit and providing no enclosure. Insulated enclosure 59 will ordinarily maintain the beverage at a temperature of, say, 70° to 90°C. The residence time of the beverage within enclosure 59 may be, for example, 5 to 15 seconds.

But when valve 55 is closed and valve 57 is open, then the beverage proceeds through conduit 53 and its cooling begins practically simultaneously.

In either case, the beverage proceeds then through conduit 61, back through heat exchangers 39, 25 and 5, in that order, in which it is progressively cooled against entering beverage, and finally reaches one of two branch conduits 63 and 65, which are controlled by valves 67 and 69, respectively. When valve 67 is open and valve 69 is closed, the beverage leaves the system through conduit 63, whereupon it may be bottled or otherwise committed to containers for shipment or storage or use. But when valve 67 is closed and valve 69 is open, then the beverage proceeds through conduit 65, through a water-cooled refrigeration unit 71 in which the temperature of the beverage is further reduced, and then proceeds to one of two conduits 73 and 75 which are controlled by valves 77 and 79, respectively. When valve 77 is open and valve 79 is closed, the beverage leaves the system through conduit 73, at a temperature lower than it would have left the system through conduit 63. But when valve 77 is closed and valve 79 is open, then the beverage proceeds through conduit 75 to a further refrigeration unit 81 which is cooled by freon or chilled water or other lower temperature heat exchange fluid than in unit 71, after which the beverage leaves the system through conduit 83 at a lower temperature than it would have left the system through conduit 73.

Under certain circumstances, it may be desirable to bottle or otherwise package the beverage at a substantially higher temperature than the exit temperature for the treated beverage from heat exchanger 5. In such cases, the units 71 and 81 may be replaced by one or more heating units (not shown).

Figure 4:
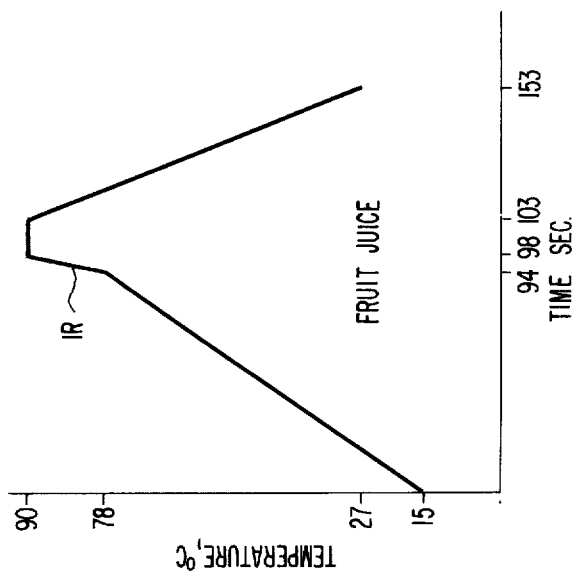
FIGS. 4, 5 and 6 are graphs of temperature versus time, showing typical suitable cycle conditions for the apparatus of FIG. 1 when used for the irradiative treatment of milk, wine and fruit juice, respectively.
Figure 5:
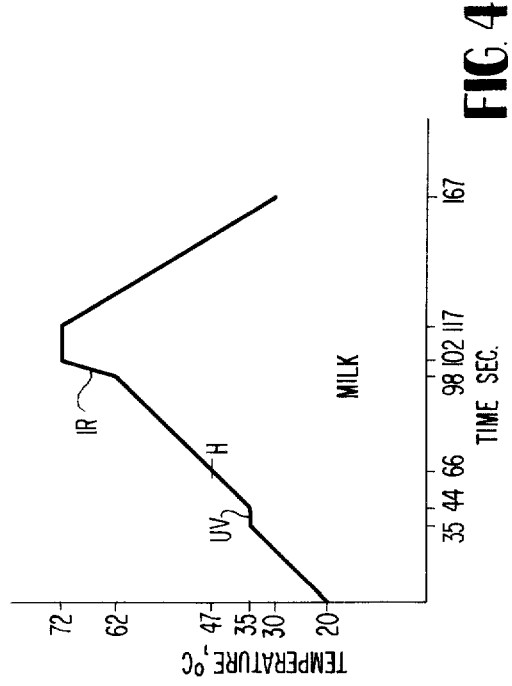
Figure 6:
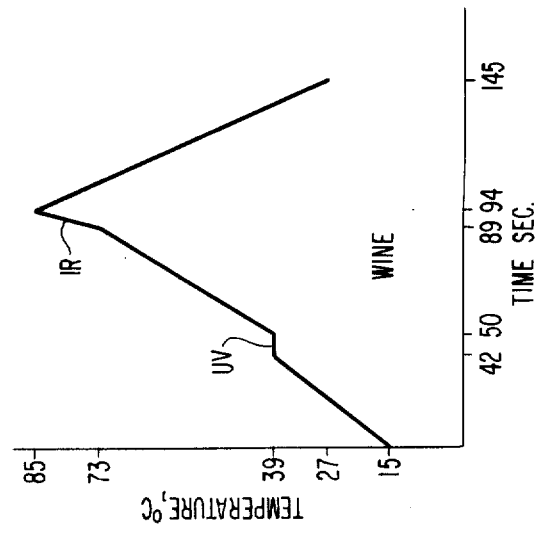

The temperatures and residence times comprising the particular examples of cycle condition suitable for milk, wine and fruit juice, are given by way of example in FIGS. 4, 5 and 6, respectively. In those figures, the temperatures of the beverage entering and leaving the cycle, and at ultra-violet irradiation, homogenization and at the beginning and end of infra-red irradiation, are given on the ordinates. The corresponding times in seconds are given on the abscissae. These values can easily be read from FIGS. 4–6, and so need not be repeated in this text. The symbols "UV", "IR" and "H" refer to ultra-violet, infra-red and homogenization, respectively.

Suffice it to say that, as is evident from FIGS. 4–6, in the case of milk, the beverage will proceed through ultra-violet unit 15, homogenizer 35 and infra-red unit 41. In the case of wine, where no homogenization is needed, the valve 31 will be closed and the valve 33 will be open, and the beverage will proceed through ultra-violet unit 15 and infra-red unit 41. In the case of fruit juice, if no ultra-violet irradiation is needed, then the valve 11 will be closed and the valve 13 will be open and the beverage will bypass the ultra-violet unit 15 as well as the homogenizer 35 and will be irradiated only in infra-red unit 41.

In any case, the beverage moves through the entire cycle in all-liquid circuit, out of contact with gas and in particular, out of contact with air.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A method for the irradiation of beverages, comprising passing the beverage through transparent tubing of circular cross-section, exposing the beverage to ultra-violet irradiation through said transparent tubing, applying infra-red radiation to the beverage in said transparent tubing, passing the beverage in indirect heat exchange with itself before the ultra-violet irradiation and after the exposure to the infra-red radiation, thereby to warm the entering beverage and cool the exiting beverage, maintaining the beverage out of contact with the air during at least said heat exchange and ultra-violet and infra-red exposure, maintaining the beverage at a pressure of 1.5 to 15 kgs/cm$^2$ during the exposures, and homogenizing the beverage, said homogenization being conducted between the ultra-violet exposure and the infra-red exposure.

2. A method as claimed in claim 1, in which the ultra-violet exposure is performed at a lower temperature than the infra-red exposure and in which the beverage is heat exchanged against itself between the ultra-violet and the infra-red exposure.

3. A method as claimed in claim 1, in which the beverage is heat exchanged against itself before and after homogenization so that the homogenization is performed at a temperature level intermediate the temperature levels of the ultra-violet and the infra-red exposure.

4. Apparatus for the irradiation of beverages, comprising transparent tubing of circular cross-section, means for passing the beverage through said transparent tubing, means for exposing the beverage to ultra-violet irradiation through said transparent tubing, means for applying infra-red radiation to the beverage in said transparent tubing, means passing the beverage in indirect heat exchange with itself before the ultra-violet irradiation and after the exposure to the infra-red radiation, thereby to warm the entering beverage and cool the exiting beverage, means maintaining the beverage out of contact with the air during at least said heat exchange and ultra-violet and infra-red exposure, means maintaining the beverage at a pressure of 1.5 to 15 kgs/cm$^2$ during the exposure, and means for homogenizing the beverage, the homogenizing means being disposed between the ultra-violet exposure means and the infra-red exposure means.

5. Apparatus as claimed in claim 4, and means for heat exchanging the beverage against itself between the ultra-violet and infra-red exposures.

6. Apparatus as claimed in claim 4, and means for heat exchanging the beverage against itself before and after homogenization, so that the homogenization is performed in a temperature level intermediate the temperature level of the ultra-violet and the infra-red exposures.

* * * * *